United States Patent [19]

Rabinkin

[11] Patent Number: 4,746,379
[45] Date of Patent: May 24, 1988

[54] LOW TEMPERATURE, HIGH STRENGTH NICKEL-PALLADIUM BASED BRAZING ALLOYS

[75] Inventor: Anatol Rabinkin, Morris Plains, N.J.

[73] Assignee: Allied-Signal Inc., Morris Township, Morris County, N.J.

[21] Appl. No.: 89,276

[22] Filed: Aug. 25, 1987

[51] Int. Cl.[4] .................... C27C 19/00; B23K 35/30
[52] U.S. Cl. .................................................. 148/403
[58] Field of Search ............... 148/403; 228/263.15; 148/410, 442; 420/580, 456

[56] References Cited

U.S. PATENT DOCUMENTS

| | | | |
|---|---|---|---|
| 4,405,391 | 9/1983 | De Cristofaro | 148/403 |
| 4,448,618 | 5/1984 | Bose et al. | 148/403 |
| 4,508,257 | 4/1985 | Bose et al. | 228/263.15 |
| 4,658,537 | 4/1987 | Bose et al. | 228/263.15 |

*Primary Examiner*—Upendra Roy
*Attorney, Agent, or Firm*—Gus T. Hampilos

[57] ABSTRACT

Nickel based alloy compositions are disclosed comprising between about 25 and about 35 atom percent palladium, about 10 to about 13 atom percent of at least one of boron and silicon, from about 5 to about 20 atom percent cobalt, up to about 5 atom percent molybdenum, the alloys exhibiting a liquidus temperature of less than about 950° C. The alloys are particularly suited for brazing stainless steel and cemented carbide joints. Also disclosed are brazing processes utilizing the alloys.

8 Claims, No Drawings

LOW TEMPERATURE, HIGH STRENGTH NICKEL-PALLADIUM BASED BRAZING ALLOYS

FIELD OF THE INVENTION

This invention is directed to low temperature, high strength nickel-palladium base alloys which are particularly useful for brazing cemented carbide parts. More particularly, the invention is directed to nickel-palladium alloys containing cobalt and certain metalloids and having liquidus temperatures of less than about 950° C.

BACKGROUND OF THE INVENTION

Brazing is a process for joining parts, often of dissimilar compositions, to each other. Typically, a filler metal that has a melting point lower than that of the parts to be joined together is interposed between the parts to form an assembly. The juncture of the assembled parts and the filler metal is then heated to a temperature sufficient to melt the filler metal but generally lower than the melting point of the parts. Upon cooling, a strong, void free joint is formed.

One class of products produced by brazing processes is cemented carbide cutting tools. These tools are usually formed by brazing the cemented carbide cutting tip to a holder or shank. Many of these tools are used under condition which expose them to high temperature, high stresses and high erosion conditions; for example, drill bits for oil exploration and well drilling. Accordingly, it is necessary to insure that the brazing filler metal employed has excellent high temperature strength, corrosion resistance and erosion resistance.

A particular problem, however, with cemented carbide tools is that they are prone to brittle fracture under conditions or rather moderate gradients in stress distribution, particularly those gradients created by non-uniform thermal expansion. Therefore, it is essential that the brazing filler metal employed exhibit a low melting point in order to minimize stresses induced by thermal expansion. In addition, more recently, the need for low temperature brazing metal was recognized for the production of cemented carbide tools which include polycrystalline diamond cutting tips. Specifically, in the manufacture of these diamond-tipped tools, brazing of the diamond-tipped cemented carbide cutter to the shank must be carried out at low temperatures because of the high degree of thermal instability exhibited by the polycrystalline diamond tip.

Until now, the brazing industry employed three different brazing filler materials in the production of cemented carbide parts intended to operate at elevated temperatures. The first filler metal, Au-18Ni, is a very expensive alloy which brazes well but suffers from a rather high melting temperature range (925°–985° C.) and from a low rupture strength at elevated temperatures. The second filler metal, Cu-10Co-31.5Mn, also brazes well but, like the gold-based alloy, has a high melting temperature range. In addition, this copper-based alloy has low corrosion resistance and poor high temperature strength because of its high manganese content. More recently, a class of brazing filler metals was developed which exhibit high temperature strength, good corrosion resistance and good erosion resistance. This third class of alloys, disclosed in U.S. Pat. Nos. 4,508,257, 4,405,391 and 4,448,618, are Ni-Pd base alloys. These alloys, however, exhibit high melting points and were originally developed for brazing superalloys. In addition, when employed to braze cemented carbide parts, they tend to react with the cemented carbide parts, leaching the cobalt from the base metal and thereby causing microporosity at the braze interface. This microporosity increases the risk of catastrophic failure in the brazed joints resulting from brittle fracture in the base metal.

There remains a need in the art for new brazing filler metal which can be used at low brazing temperatures (preferably, below about 925° C.), do not react adversely with the base metal and, at the same time, exhibit good strength at elevated temperatures, good corrosion resistance and good erosion resistance.

SUMMARY OF THE INVENTION

The present invention is directed to an alloy having a composition represented by the formula:

plus incidental impurities, where the subscripts are in atom percent and "a" is in the range of 0 to about 10, "b" is in the range of about 25 to about 35, "c" is in the range of 0 to about 13, "d" is in the range of 0 to about 13, "e" is in the range of about 5 to about 20, "f" is in the range of 0 to about 5, and the sum of c+d is in the range of about 10 to about 13.

Preferably, the alloy is in a metastable structural state having at least 50 percent glassy structure.

In addition, the invention provides a brazing filler metal of the above-noted composition in foil form. The foil is homogeneous and ductile.

Further, there is provided an improved process for joining two or more parts by brazing. More particularly, there is provided a process for brazing two or more parts at least one of which comprises cemented carbides, which process comprises the steps of:

(a) juxtaposing a cemented carbide-containing component and an article of manufacture to define a joint therebetween;

(b) supplying to the joint a brazing filler alloy having a composition represented by the formula:

plus incidental impurities, where the subscripts are in atom percent and "a" is in the range of 0 to about 10, "b" is in the range of about 25 to about 35, "c" is in the range of 0 to about 13, "d" is in the range of 0 to about 13, "e" is in the range of about 5 to about 20, f is in the range of 0 to about 5, and the sum of c+d is in the range of about 10 to about 13;

(c) heating the brazing filler alloy to cause melting thereof; and, (d) cooling the melted brazing filler alloy to produce a brazed joint.

DETAILED DESCRIPTION OF THE INVENTION

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. Ideally, the brazing material is in ductile foil form so that complex shapes may be stamped therefrom. Finally, the brazing foil should be homogeneous; that is, contain no binders or other materials that would otherwise form voids or contaminating residues during brazing.

The present invention is directed to improved alloys which are particularly suitable as brazing filler materials for joining cemented carbide-containing components and stainless steels. Most generally, the alloys are represented by the formula:

$$Cr_aPd_bB_cSi_dCo_3Mo_fNi_{bal}$$

plus incidental impurities, where the subscripts are in atom percent and "a" is in the range of 0 to about 10, "b" is in the range of about 25 to about 35, "c" is in the range of 0 to about 13, "d" is in the range of 0 to about 13, "e" is in the range of about 5 to about 20, "f" is in the range of 0 to about 5, and the sum of c+d is in the range of about 10 to about 13.

The nickel base alloys of the present invention offer a unique combination of properties not heretofore obtainable from prior art alloys. Most basically, the alloys of the present invention exhibit a liquidus of less than about 950° C., and preferably less than about 925° C., with some of the most preferred alloys exhibiting a liquidus of less than about 900° C. Such a low melting temperature provides the alloys of the present invention with the unique advantage of being useful for brazing low melting point materials and metastable components, such as diamonds, which are detrimentally affected by brazing at high temperatures. As discussed above, the alloys of the present invention are especially suited for brazing cemented carbide parts.

Each constituent imparts certain of the unique combination of characteristics attributed to the Ni-base alloys of the present invention. The low liquidus of the alloys of the present invention results principally from the high nickel-palladium content in the alloys. In addition, palladium has the beneficial effect of enhancing corrosion resistance. Accordingly, palladium is present in the alloy in the range of from about 25 to about 35 atom percent. Boron and silicon are added to enhance the ability of the alloys to exist in the amorphous form and to lower the melting point of the alloys. However, the total boron and silicon content cannot be so great as to cause excessive erosion of the base metal during brazing or to cause the formation of a separate phase of brittle intermetallic compounds in the brazement. Accordingly, the total boron and silicon content is within the range of between about 10 and about 13 atom percent.

Alloys of the present invention also include substantial amounts of cobalt. Cobalt is added to decrease the cobalt concentration gradient across the cemented carbide-joint interface thus diminishing substantially the driving force for unidirectional diffusion of cobalt out of the cemented carbide base material. As noted above, diffusion of cobalt from the base material leads to microporosity of the brazed part which reduces strength. Accordingly, cobalt is present in the alloys in an amount between about 5 and about 20 percent and more preferably between about 5 and about 12 atom percent. Preferably, molybdenum is also present in an amount between about 1 and about 5 atom percent. More preferably, molybdenum is present in an amount not to exceed about 3.5 atom percent. The role of molybdenum in the alloys of the present invention is to preserve the low melting temperature of the alloy while decreasing the overall mass transfer (mobility) of the high mobility species in the alloy. More specifically, molybdenum causes displacement of the eutectic points to lower corresponding contents of boron and silicon in the alloys thereby decreasing the amount of interstitial species necessary to form the eutectics and thus making easier the formation of amorphous alloys. Finally, in addition, the alloy can contain chromium in an amount up to about 10 atom percent in order to further improve corrosion resistance.

The alloys of the present invention can be produced in various forms, such as powders, foils, ribbons and wires by application of various well known techniques. Methods commonly used to fabricate alloys in powder form include gas or water atomization or mechanical pulverization. The most preferred method used to fabricate alloys of the present invention into foils, ribbons or wire is rapid solidification.

Rapid solidification processes are processes of quenching molten material at quenching rates greater than about $10^3°$ C./sec. Among the variety of rapid solidification processes available today, the most preferred process employs a rapidly rotating chill wheel onto which a molten alloy is cast. Such a process is disclosed in U.S. Pat. No. 4,221,257 to Narasimhan, commonly assigned.

Rapidly solidified products produced from homogeneous melts of the alloys are usually homogeneous in the solid state. The products may be glassy or crystalline depending upon the alloy compositions and processing parameters. In addition, products at least 50% glassy exhibit sufficient ductility to enable foil, ribbon and wire forms of the alloys to be bent to a radius as small as ten times their thickness without fracture. Preferably, alloys of the present invention are rapidly solidified with quenching rates of at least about $10^5°$ C./sec. Such quenching rates produce alloys which are at least about 50% glassy and, as a result, are sufficiently ductile so as to enable them to be stamped into complex shapes. More preferably, the alloys of the present invention are at least about 80% glassy, and most preferably substantially glassy because substantially glassy alloys exhibit the highest degree of ductility.

The alloys of the present invention are particularly suited as brazing filler metals. Most preferably, the alloys are produced in foil form and are useful regardless of whether the foil is glassy or microcrystalline. The foils of the present invention typically are between about 0.0005 and about 0.004 inches (about 12 to 100 micrometers) thick. In many instances, the foil thickness corresponds to the desired spacing between parts to be brazed.

The brazing foils of the present invention are uniquely suited for brazing stainless steels and, more particularly, cemented carbide parts. The brazing process comprises the basic steps of juxtaposing at least two parts so as to define a joint therebetween to be brazed, supplying to the joint the brazing foil of the present invention, heating the brazing foil to a temperature above the liquidus (ordinarily between about 30° and about 70° C. above the liquidus), and thereafter cooling the brazing material to produce a brazed joint. Brazed products produced from the present invention exhibit brazements having high strength at elevated temperatures, good corrosion resistance and good erosion resistance.

The following examples illustrate certain embodiments of the present invention but are not intended to limit the scope of the invention as defined in the subjoined claims.

EXAMPLE 1

Ribbons of from about 2.54 to about 25.4 mm (about 0.10 to 1.00 inch) wide and about 13 to 76 micrometers (about 0.0005 to 0.003 inch) thick were formed by continually depositing a melt of each of the composition designed as Samples 3–8 in Table 1, below, by overpressure of argon onto a rapidly rotating copper chill wheel (surface speed about 3000 to 6000 ft/min). Metastable homogeneous ribbons were produced from these composition. The ribbons of Samples 3–8 were substantially glassy. Samples 1 and 2 were as received from the supplier. Samples 1–3 are prior art compositions. Samples 4–8 are alloy compositions within the scope of the present invention.

TABLE 1

| Sample No. | Alloy Designation | Nominal Chemical Composition, wt (at) % | | | | | | | | | |
|---|---|---|---|---|---|---|---|---|---|---|---|
| | | Cu | Co | Mn | Ni | Mo | Si | B | Pd | Au | Fe | Cr |
| 1 | Cocuman, WESCO | 58.5 (53.3) | 10 (10.2) | 31.5 (43.5) | — — | — — | — — | — — | — — | — — | — | — |
| 2 | Gold-Nickel 82-18, Johnson & Matthew | — — | — — | — — | 18.0 (42.4) | — — | — — | — — | — — | 82.0 (57.6) | — | — |
| 3 | METGLAS Alloy MBF-1002 | — — | — — | — — | 46.95 (47.37) | — — | — — | 2.7 (14.79) | 32.25 (17.73) | — — | 9.5 | 8.6 |
| 4 | Alloy of the present invention | — — | 5.0 (5.86) | — — | 43.2 (51.16) | — — | 5.0 (12.38) | — — | 46.8 (30.57) | — — | — | — |
| 5 | Alloy of the present invention | — — | 5.0 (5.37) | — — | 40.0 (48.02) | 4.5 (3.3) | 5.0 (12.55) | — — | 45.5 (30.14) | — — | — | — |
| 6 | Alloy of the present invention) | — — | 10.0 (11.91) | — — | 35.0 (42.02) | 4.5 (3.3) | 5.0 (12.55) | — — | 45.5 (30.10) | — — | — | — |
| 7 | Alloy of the present invention | — — | 10.02 (11.92) | — — | 35.24 (42.06) | 4.52 (3.31) | 4.01 (10.00) | .39 (2.56) | 45.78 (30.13) | — — | — | — |
| 8 | Alloy of the present invention | — — | 10.01 (1.92) | — — | 35.21 (42.06) | 4.53 (3.31) | 3.81 (7.50) | .67 (5.06) | 45.75 (30.13) | — — | — | — |

EXAMPLE 2

The liquidus and solidus temperatures of ribbons of each of Samples 1–8 were determined by the Differential Thermal Analysis (DTA) technique. Individual samples were heated side by side with an inert reference material at a uniform rate and the temperature difference between them was measured as a function of temperature. The resulting curve, known as a thermogram (a plot of heating energy change vs. temperature, from which the beginning of melting and end of melting, known respectively as solidus and liquidus) was determined. Values of the solidus and liquidus determined from the thermograms are set forth in Table 2, below.

TABLE 2

| Sample No. | Melt Range °C. (°F.) | |
|---|---|---|
| | Solidus | Liquidus |
| 1 | 910 (1670) | 1000 (1832) |
| 2 | 925 (1697) | 985 (1805) |
| 3 | 900 (1652) | 1010 (2030) |
| 4 | 820 (1508) | 870 (1598) |
| 5 | 847 (1556) | 895 (1643) |
| 6 | 860 (1580) | 905 (1661) |
| 7 | 818 (1504) | 885 (1625) |
| 8 | 837 (1539) | 874 (1605) |

The results of the DTA for each of the samples clearly illustrate the lower brazing temperatures which can be employed when using alloys of the present invention (Sample 4–8).

EXAMPLE 3

Cemented carbide blanks of approximately 94 wt.% tungsten carbide and 6 wt.% Co (K68 grade, Kennametal) measuring about 2.54 cm×1.27 cm×0.32 cm were polished using 600 grade glass paper. Lap joint samples (i.e., brazed overlapping blanks) were manufactured in order to test the shear strength of cemented carbide brazements prepared from the alloys of the present invention as compared to alloys of the prior art. Sample preparation was as follows: brazing filler metals of the present invention (Samples 4–8) and foils of the previously known alloys, namely, Cu-10CO-31.5 Mn (Sample 1), 82-18 gold-nickel (Sample 2) and MBF-1002 (Sample 3), of substantially the same thickness were each preplaced in the gap between two blanks rested on a supporting plate. Each set of blanks was then induction-brazed under nitrogen atmosphere at temperatures 50° higher than the liquidus of each brazing alloy tested. Upon cooling, each brazed product was cleaned and the excessive filler metal accumulated in fillets was filed out in such a manner that the step in the overlap had a rectangular profile. A six sample set of brazed parts was prepared using each of the alloy compositions recited in Table 1 in order to obtain a reliable data matrix. The brazed parts were shear-tested employing an Instron testing machine and a guidance device in accordance with testing procedure described by Datta A., et al. "Rapidly Solidified Copper-Phosphorus Base Brazing Foil, "Welding Journal", 65, N1, 14 (1986). Table 3 contains the results of the shear tests.

TABLE 3

| Product from Sample No. | σs average, MPa (ksi) |
|---|---|
| 1 | 216 (31.4) |
| 2 | 174 (25.2) |
| 3 | 121 (17.5) |
| 4 | 240 (34.8) |
| 5 | 257 (37.3) |
| 6 | 188 (27.2) |
| 7 | 192 (27.8) |
| 8 | 174 (25.2) |

The data in Table 3 clearly show that joints manufactured from the alloys of the present invention exhibit equal to or substantially greater shear strength than joints produced from prior art alloys, notwithstanding the fact that brazed parts produced from Samples 4-8 were brazed at substantially lower temperatures than those employed with the prior art alloys.

I claim:

1. An alloy having a composition represented by the formula:

$$Cr_a Pd_b B_c Si_d Co_e Mo_f Ni_{bal}$$

plus incidental impurities, where the subscripts are in atom percent and "a" is in the range of 0 to about 10, "b" is in the range of about 25 to about 35, "c" is in the range of 0 to about 13, "d" is in the range of 0 to about 13, "e" is in the range of about 5 to about 20, "f" is in the range of 0 to about 5, and the sum of c+d is in the range of about 10 to about 13.

2. An alloy as recited in claim 1 wherein the alloy is at least about 50% glassy.

3. An alloy as recited in claim 1 which is at least about 90% glassy.

4. As alloy as recited in claim 1 wherein "f" is in the range of about 1 to about 5.

5. An alloy as recited in claim 1 wherein "c" is in the range of about 5 to about 12.

6. An alloy as recited in claim 5 wherein "f" is not more than about 3.5.

7. An alloy as recited in claim 1 wherein the alloy has a liquidus temperature not greater than about 925° C.

8. A nickel-based alloy comprising from about 25 to about 35 atom percent palladium, from about 10 to about 13 atom percent of at least one of B and Si, from about 5 to about 20 atom percent Co, and molybdenum is an amount not to exceed about 5 atom percent, and exhibiting a liquidus temperature of less than about 950° C.

* * * * *

UNITED STATES PATENT AND TRADEMARK OFFICE
CERTIFICATE OF CORRECTION

PATENT NO. : 4,746,379
DATED : May 24, 1988
INVENTOR(S) : A. Rabinkin

It is certified that error appears in the above-identified patent and that said Letters Patent are hereby corrected as shown below:

Col. 3, line 12: "$Cr_a Pd_b B_c Si_d Co_3 Mo_f Ni_{bal}$" should read --

$Cr_a Pd_b B_c Si_d Co_e Mo_f Ni_{bal}$ --.

Col. 8, line 21: "As" should read -- An --.

Signed and Sealed this

Eleventh Day of October, 1988

Attest:

DONALD J. QUIGG

Attesting Officer        Commissioner of Patents and Trademarks